United States Patent
Raczek et al.

(10) Patent No.: US 6,787,166 B2
(45) Date of Patent: Sep. 7, 2004

(54) USE OF AN ACID PREPARATION AS FEED ADDITIVE IN FARM ANIMAL HUSBANDRY

(75) Inventors: Nico N. Raczek, Kelkheim (DE); Christoph Mollenkopf, Frankfurt am Main (DE)

(73) Assignee: Nutrinova Nutrition Specialties & Food Ingredients GmbH, Wiesbaden (DE)

( * ) Notice: Subject to any disclaimer, the term of this patent is extended or adjusted under 35 U.S.C. 154(b) by 227 days.

(21) Appl. No.: 10/015,913

(22) Filed: Oct. 31, 2001

(65) Prior Publication Data

US 2002/0086090 A1 Jul. 4, 2002

(30) Foreign Application Priority Data

Nov. 9, 2000 (DE) .......................................... 100 55 390

(51) Int. Cl.[7] .................................................. A23K 1/18
(52) U.S. Cl. ............................. 426/2; 426/654; 426/807
(58) Field of Search ............................. 426/2, 654, 807

(56) References Cited

U.S. PATENT DOCUMENTS 4,444,796 A * 4/1984 Ueno et al. .................. 426/335

FOREIGN PATENT DOCUMENTS

| DE | 197 10 127 A1 | 9/1998 |
|---|---|---|
| DE | 197 39 319 A1 | 3/1999 |
| WO | 0 071 331 A2 | 2/1983 |
| WO | WO 92/03938 A1 | 3/1992 |
| WO | WO 98/20749 A1 | 5/1998 |

OTHER PUBLICATIONS

F. X. Roth and M Kirchgessner, *Organic acids as feed additives for young pigs: Nutritional and gastrointestinal effects*, Journal of Animal and Feed Sciences, Bd. 7, (1998) pp 25–33: Institute of Nutrition Physiology, Technical University of Munich, D–85350, Freising–Weihenstephan, Germany.

Manfred Kirchgessner and Franz Roth, *Ergotrope Effekte durch nutritiven Finsatz von organischen Säuren*, Gustav Fischer Verlag, Zbl. Hyg. (1991), 265–276; 191, Stuttgart/New York.

M. Kirchgessner; F. Roth; and B.R. Paulicks, *Zur nutritiven Wirkrung von Sorbinsäure in der Ferkelaufzucht*, J. Anim. Physiol. A. Anim. Nutr. (1995) 235–242; 74, Blackwell Wissenschafts–Verlag, Berlin ISSN 0931–2439.

* cited by examiner

Primary Examiner—C. Sayala
(74) Attorney, Agent, or Firm—ProPat, L.L.C.

(57) ABSTRACT

The present invention relates to a highly stable, readily handleable preparation for use in animal feeds. The preparation comprises sorbic acid, at least one other liquid acid and one other solid organic acid and if appropriate a carrier. The active compound content (as acid) is always greater than 80% by weight. In addition, the invention relates to the use of the preparation alone in feeds or in mixture with other feed additives to improve the hygienic status of the feed and for growth promotion in farm animal husbandry.

19 Claims, No Drawings

USE OF AN ACID PREPARATION AS FEED ADDITIVE IN FARM ANIMAL HUSBANDRY

BACKGROUND OF THE INVENTION

1. Field of the Invention

The invention relates to a storage-stable preparation that comprises sorbic acid and other acids and can be used alone in feeds or in a mixture with other feed additives in farm animal husbandry.

In the animal feed sector, antibiotics are frequently used as growth promoters. The use of antibiotics in this sector is under suspicion for being responsible for hazards which start from resistant bacteria that can also in the long term endanger human health. Therefore, products which are of less concern for health must be sought for this usage. Thus, in other sectors also, substances which are of concern for health physiologically and epidemiologically, or are harmful for the environment, for example antibiotics, formaldehyde-releasing substances, halogenated substances, and many more, are increasingly being replaced by substances of less concern for example in foods, feeds, pet food, silages, pomace, or other wastes from the food industry. The purpose of these substances, firstly, is directed toward retaining the value of the actual product. Secondly, however, their hygienic state is to be improved, or prolonged shelf-life is to be achieved.

2. Description of the Related Art

It is known that sorbic acid can be used to preserve feeds. Sorbic acid (trans,trans2,4-hexadienoic acid) is a colorless solid compound which dissolves only sparingly in cold water and is used worldwide as a preservative. The principle of action is determined by sorbic acid in undissociated form. The optimum action is therefore exhibited by sorbic acid in the acidic pH range. Sorbic acid and its salts have a very good microbiostatic, antimycotic action. At the same time, sorbic acid, as an unsaturated fatty acid, is virtually nontoxic, which is confirmed by very extensive data, and by the decades-long use of this acid in the food sector, in animal feed etc.

In addition to sorbic acid, other organic acids have been used for years to preserve feeds and to improve feed hygiene. Special requirements may be made of hygienic quality precisely in feed for young animals. Therefore, some organic acids are approved as feed additives, on the basis of national provisions in feedstuff law without limitation of maximum levels.

Previously, feed experiments have been carried out, predominantly with piglets, which verified that various organic acids, such as citric acid, fumaric acid or formic acid are able to affect animal growth in a positive manner if they are admixed to the piglet feed in an optimum dose (Kirchgessner and Roth 1991; Roth and Kirchgessner 1998). Very recently, it has also been shown that sorbic acid at high concentrations (1.8–2.4% sorbic acid, based on the feed) has a high nutritional activity for growing piglets (Kirchgessner et al. 1995).

Individual organic acids are increasingly being used in animal nutrition. Frequently, the liquid state, the volatility of some acids or, however, poor solubility of their sodium, potassium, calcium or magnesium salts is disadvantageous. Frequently, poor miscibility or incompatibility of these acids may be observed. Thus, for example, mixtures of formic acid and benzoic acid exhibit a rapid brown discoloration, which is possibly due to oxidation reactions.

It is known that feeds have a high buffering capacity. In order to overcome this buffering capacity of the feed, acids can be admixed to the feed. In addition, owing to the dependence on the pH, there is the necessity, in feeds having a high buffering capacity, to use high concentrations of some acids which, for example when propionic acid is used, very rapidly make themselves noticeable disadvantageously by their sensory properties. DE-A 197 39 319 describes a solution to this problem. There, salts impregnated with liquid carboxylic acids are described, in particular combinations of preservative acids with corresponding salts. In the case of the impregnated salts described in DE-A 197 39 319, however, the required pH reduction cannot be achieved, since the salts already present buffer the pH (see Example 15 in DE-A 197 39 319: impregnated salt of sodium formate and formic acid: from pH 6.4 to 5.5 and 5.1 at 10 or 20 kg/metric t of feed). In addition, in the case of the impregnated salts described in DE-A 197 39 319, rapid discoloration or liquefaction must be expected. These changes may be observed even after a short time without sufficiently large carrier/stabilizer quantities, so that here virtually no usable product can be obtained. Furthermore, an active compound content of only up to about 75% by weight (calculated as total acid) is achieved.

Overall, a disadvantage of such previously known feed additives, impregnated salts and the feeds produced therewith was that they are relatively unstable and, even after a relatively short storage time, deliquesce, clump or show brown discoloration. In addition, they do not contribute to effective acidification of the feed, and only a little acid can be added per unit weight of the additive. The object was therefore to provide a stable mixture of acids which does not have these disadvantages.

SUMMARY OF THE INVENTION

This object is achieved by a preparation (composition), which comprises sorbic acid, at least one organic acid which is liquid at room temperature (=23° C.) and at least one other organic acid which is solid at room temperature, which are different from sorbic acid. Preference is given to a preparation which, in addition to said constituents, comprises a carrier.

Surprisingly, the inventive preparations do not have the abovedescribed disadvantages. The preparations rather show an unexpected high stability, combined with good properties in handling. Furthermore, effective acidification of the feed is achieved. In addition, surprisingly, a beneficial effect on growth performance of young animals can be observed, even at relatively small amounts of acid.

The percentages by weight specified below relate to the total mass of the preparation.

DETAILED DESCRIPTION OF THE INVENTION

The liquid acids are organic acids which are liquid at room temperature (=23° C.). The solid acids are organic acids different from sorbic acid which are solid at room temperature (=23° C.). The organic acids which can be used according to the invention include, for example, formic acid, acetic acid, propionic acid, butyric acid, valeric acid, isobutyric acid, trimethylacetic acid, isovaleric acid, 2-methylbutyric acid, hexanoic acid, succinic acid, adipic acid, fumaric acid, malic acid, tartaric acid, citric acid, lactic acid, ascorbic acid, gluconic acid and amino acids, in particular essential amino acids. Liquid acids which can be used, however, are also inorganic acids such as phosphoric acid, hydrochloric acid or sulfuric acid. Preferably, phosphoric acid, propionic acid, acetic acid, lactic acid, valeric acid, formic acid or butyric acid is used. Of the solid acids, preferably fumaric acid, tartaric acid or malic acid is used, particularly preferably citric acid.

The inventive preparation comprises 10–50% by weight, preferably 25–45% by weight, and very particularly preferably 30–40% by weight, of sorbic acid. In addition, >0–40% by weight, preferably 10–35% by weight, particularly preferably from 20 to 32.5% by weight, of one or more acid(s) which are liquid at room temperature (=23° C.). Furthermore, one or more other organic acid(s) which are solid at room temperature (=23° C.) in amounts from >0 and 50% by weight, preferably 25–45% by weight, particularly preferably 25–35% by weight.

The carriers used can be organic or inorganic, acid-resistant materials having a porous structure. These include, for example, diatomaceous earths, clay, sand, nylon powder, cereal bran, insoluble metal oxides, insoluble metal salts, aerosil, corundum, ground glass, granite, quartz, flint, aluminum phosphate, kaolin, bentonite, zeolite, calcium silicate, talcum, titanium oxides, activated carbon, bonemeals and, in particular, synthetic or natural amorphous precipitated silicicacids, magnesium silicates orsodium aluminum silicates. Surprisingly, it has been found that when a defined sodium aluminum silicate is used, that is to say perlite (E 599), for example as Perligran A, M, F, E/L, 0, 0/1 or Perligran powder 1, Superlite powder 1 (Deutschen Perlite GmbH, Dortmund), the preparation has particularly good properties. When perlite is used as carrier, the inventive preparation has a high color stability and a flowable and easily handled product is obtained. Although, for example, bentonite and silicic acids are also suitable as carriers, in the case of these carriers, when high proportions of liquid organic acid are used, clumping of the preparations is exhibited after some weeks of storage time. In unfavorable storage conditions, also, deliquescence of the preparations or strong brown discoloration may also be observed.

As carriers and for stabilizing the preparations, >0–20% by weight, preferably 5–15% by weight, and particularly preferably 7–10% by weight, of the above-mentioned carrier materials are used alone or in combination.

The inventive preparation is produced, for example, by adding dropwise the liquid acid(s) to the solid acids, with simultaneous mechanical mixing. If the inventive preparation comprises a carrier, the liquid acid(s) is(are) first expediently applied to the carrier in a commercially conventional tumbling mixer or other conventional mixer and then the sorbic acid and the other solid organic acid(s) are added.

Suitable animal feedstuffs are, for example, green feed, silages, dried green feed, roots, tubers, fleshy fruits, grains and seeds, brewer's grains, pomace, brewer's yeast, distiller's spent grains, milling byproducts, byproducts of the production of sugar, starch and oil recovery and various food wastes. Certain feed additives (for example antioxidants) or mixtures of various substances (for example mineral mixtures, vitamin mixtures) can be added to such feeds for enhancement. Specific feeds are also adapted for certain animal species and their stages of development. This is, for example, the case in piglet husbandry. Here, suckling pigletfeed and piglet growth feed are used. The inventive preparation can be added directly to the animal feed or, in a mixture with other animal feed additives, or via premixes to the actual feed. The preparation can be added dry to the feed, can be added before further processing (for example extrusion) or can be added dispersed in a mixture. For these purposes, expediently, preparation concentrations from 0.125 to 7.5% by weight (based on the feed) are used, preferably 1.5–4.5% by weight.

The preparation can be added as sole additive to animal feeds, for example for calf or lamb husbandry, particularly preferably to suckling piglet feed (prestarter) and piglet growth feed (starter feed) or can be used in a mixture with other feed additives for these animals.

Surprisingly, it has been found that even by adding small amounts of inventive preparations, marked growth improvements with respect to growth rates and feed utilization can be achieved in piglet husbandry. To ensure significant nutritive activity, an addition of inventive preparations in amounts of 1.0 to 7.5% by weight, based on the feed is expedient, preferably 1.5–4.5% by weight.

Equally, the inventive preparations are suitable in calf husbandry as an additive to milk replacement feed, in particular at concentrations from 0.125 to 5% by weight, preferably from 0.2 to 3% by weight, based on the total feed.

In addition, the inventive preparations are suitable in sheep husbandry as milk replacer additive in the early weaning of suckling lambs or when lambs are raised without mothers, in particular at concentrations from 0.125 to 5% by weight, preferably from 0.2 to 3% by weight, based on the total feed.

The inventive preparations are in a solid state. The present invention solves not only the otherwise problematic handling of liquid acids, but also a separation or deliquescence after a certain storage time of the mixed products or impregnated salts. The preparation proves to be, in addition, particularly color-stable and exhibits no brown discoloration, as is shown by mixtures of salts according to DE-A 197 39 319.

In addition, the inventive preparation has the ability of decreasing the pH of feeds unexpectedly greatly, which has an effect on the hygienic status of the feed, as a result of which improved storage life of microbiologically sensitive feeds is achieved. The buffering capacity of the feed is substantially better overcome by using the inventive preparations than, for example, by using the impregnated salts according to DE-A 197 39 319, in part also better than by the use of a carboxylic acid alone, The invention is described below with reference to examples.

EXAMPLE 1

30 g of propionic acid are added dropwise to 10 g of Perligran 0 (Deutsche Perlite GmbH, Dortmund) with simultaneous mechanical mixing. Then 30 g each of citric acid and sorbic acid are added and mixed well.

EXAMPLE 2

30 g of formic acid are added dropwise to 10 g of Perligran 0 with simultaneous mechanical mixing. 30 g each of citric acid and sorbic acid are then added and mixed well.

EXAMPLE 3

30 g of lactic acid (80% strength) are added dropwise with simultaneous mechanical mixing of 10 g of Perligran 0. 24 g each of citric acid and sorbic acid are then added and mixed well.

EXAMPLE 4

30 g of acetic acid are added dropwise to 10 g of Perligran 0 with simultaneous mechanical mixing. 30 g each of citric acid and sorbic acid are then added and mixed well.

EXAMPLE 5

30 g of propionic acid are added dropwise to 10 g of Perligran 0/1 (Deutsche Perlite GmbH, Dortmund) with simultaneous mechanical mixing. Then 30 g each of citric acid and sorbic acid are added and mixed well.

EXAMPLE 6

30 g of valeric acid are added dropwise to 10 g of Perligran 0 with simultaneous mechanical mixing. 30 g each of citric acid and sorbic acid are then added and mixed well.

EXAMPLE 7

40 g of propionic acid are added to 10 g of Perligran 0/1 with simultaneous mechanical mixing. 40 g each of citric acid and sorbic acid are then added and mixed well.

EXAMPLE 8

30 g of phosphoric acid (85% strength) are added dropwise to 10 g of Perligran 0 with simultaneous mechanical mixing. 30 g each of citric acid and sorbic acid are then added and mixed well.

EXAMPLE 9

40 g of phosphoric acid (85% strength) are added dropwise to 10 g of Perligran 0/1 with simultaneous mechanical mixing. 40 g each of citric acid and sorbic acid are then added and mixed well.

EXAMPLE 10

40 g of formic acid are added dropwise to 10 g of Perligran 0/1 with simultaneous mechanical mixing. 40 g each of citric acid and sorbic acid are then added and mixed well.

EXAMPLE 11

3.90 kg of formic acid are added dropwise to 1.350 kg of Perligran 0/1 with simultaneous mechanical mixing. 4.50 kg of citric acid and 5.25 kg of sorbic acid are then added and mixed well.

EXAMPLE 12

3.90 kg of propionic acid are added dropwise to 1.350 kg of Perligran 0/1 with simultaneous mechanical mixing. 4.50 kg of citric acid and 5.25 kg of sorbic acid are then added and mixed well.

EXAMPLE 13

4.70 kg of lactic acid (80% strength) are added dropwise to 1.350 kg of Perligran 0/1 with simultaneous mechanical mixing. 4.50 kg of citric acid and 5.275 kg of sorbic acid are then added and mixed well.

Impregnated salts according to DE-A 197 39 319 The impregnated salts listed in the table below were prepared in a similar manner to DE-A 197 39 319. They were stored under the conditions given below in the table without addition of other substances and checked visually for discoloration at regular intervals:

| Type of salt | Time after yellow/brown discoloration of the powder, closed - dark at 25° C./7° C. under sunlight at 25° C./7° C. | Time after yellow/brown discoloration of a 1% strength aqueous solution, closed, - dark at 25° C./7° C. - under sunlight at 25° C./7° C. |
|---|---|---|
| Impregnated salt of sorbate and acetic acid (12 g of acetic acid, 75 g of Ca sorbate) | 2 months/2 months 4–5 weeks/2 months | 3–4 weeks/— 3–4/weeks/— |
| Impregnated salt of benzoate and propionic acid (100 g of Na benzoate, 15 g of propionic acid) | 5 weeks/7 weeks 6 weeks/7 weeks | 6 weeks/8 weeks 7 weeks/7 weeks |
| Impregnated salt of sorbate and propionic acid (54 g of Ca sorbate, 8 g of propionic acid) | 1–2 weeks/4–5 weeks 1–2 weeks/3–4 weeks | 2–3 weeks/4–5 weeks 3–4 weeks/4–5 weeks |
| Impregnated salt of formic acid and sorbate (100 g of Ca sorbate, 15 g of formic acid) | 4–5 weeks/2 months 4–5 weeks/2 months | 3–4 weeks/3–4 weeks 4–5 weeks/— |

The impregnated salts specified above were, without addition of stabilizers, significantly colored in all cases under the conditions above, generally at the latest after 2 months. In contrast, the preparations from examples 1 to 10 are storage stable over 6 months under sunlight at 25° C. and show no brown discoloration or other change in their properties.

Advantageously, the content of acids in the inventive preparations exceeds in each case 80% by weight, since for stabilization, only up to 20% by weight of carrier is required. In the impregnated salts, such contents cannot be achieved.

Reduction of the pH in a Model Feed

The examples below show the inventive preparations in comparison with pure carboxylic acids and the impregnated salts according to DE-A 197 39 319.

50 g of hard wheat semolina was stirred for 10 minutes in 150 ml of drinking water. The preparation under test was then added and the pH was measured after stirring for a further 5 minutes. In detail, the pH after addition of:

0 g;
0.5 g;
1.0 g;
1.59;
2.0 g and
2.5 g of the preparation under test was used. The tables below show the resultant pH differences between model feed with and without the corresponding preparations.

| Impregnated salts | ΔpH | | | | | |
|---|---|---|---|---|---|---|
| | 0 g | 0.5 g | 1.0 g | 1.5 g | 2.0 g | 2.5 g |
| DE-A 197 39 319, Example 2 100 g of Ca formate + 15 g of formic acid | 0.0 | −0.5 | −0.9 | −1.1 | −1.3 | −1.4 |

|  | -continued | | | | | |
|---|---|---|---|---|---|---|
| DE-A 197 39 319, Example 6 100 g of Ca formate + 15 g of propionic acid | 0.0 | −0.6 | −1.3 | −1.4 | −1.5 | −1.5 |
| 100 g of Ca formate + 15 g of acetic acid | 0.0 | −0.6 | −1.1 | −1.4 | −1.5 | −1.5 |
| DE-A 197 39 319, Example 7 100 g of Ca propionate + 15 g of propionic acid | 0.0 | −0.6 | −0.7 | −0.8 | −0.8 | −0.8 |
| 100 g of Ca sorbate + 15 g of formic acid | 0.0 | −0.7 | −0.9 | −1.1 | −1.1 | −1.2 |

|  | ΔpH | | | | | |
|---|---|---|---|---|---|---|
| Acid | 0 g | 0.5 g | 1.0 g | 1.5 g | 2.0 g | 2.5 g |
| Fumaric acid | 0.0 | −2.9 | −3.3 | −3.4 | −3.5 | −3.6 |
| Citric acid | 0.0 | −2.6 | −3.1 | −3.4 | −3.5 | −3.6 |
| Acetic acid | 0.0 | −2.3 | −2.5 | −2.7 | −2.8 | −2.9 |
| Propionic acid | 0.0 | −2.1 | −2.3 | −2.5 | −2.6 | −2.7 |

| Inventive preparation | ΔpH | | | | | |
|---|---|---|---|---|---|---|
| according to | 0 g | 0.5 g | 1.0 g | 1.5 g | 2.0 g | 2.5 g |
| Example 1 | 0.0 | −2.1 | −2.5 | −2.8 | −3.0 | −3.2 |
| Example 2 | 0.0 | −2.2 | −3.0 | −3.3 | −3.4 | −3.6 |
| Example 3 | 0.0 | −2.2 | −2.7 | −3.1 | −3.3 | −3.5 |
| Example 4 | 0.0 | −2.1 | −2.6 | −2.8 | −3.1 | −3.2 |
| Example 5 | 0.0 | −1.9 | −2.5 | −2.8 | −3.0 | −3.2 |
| Example 6 | 0.0 | −2.0 | −2.5 | −2.8 | −3.0 | −3.1 |
| Example 7 | 0.0 | −2.0 | −2.5 | −2.8 | −3.0 | −3.1 |
| Example 8 | 0.0 | −2.1 | −2.6 | −3.2 | −3.4 | −3.7 |
| Example 9 | 0.0 | −2.2 | −3.0 | −3.5 | −3.8 | −4.0 |
| Example 10 | 0.0 | −2.0 | −2.8 | −3.2 | −3.4 | −3.5 |

In order to study the nutritional efficiency of the inventive preparations, feed experiments were carried out using in each case 48 weaner piglets held individually. The feed of the four experimental groups was composed isoenergetically, was offered to the animals for intake ad lib and was composed as follows:

| Composition of the feeds used (%) | | |
|---|---|---|
| Component | Prestarter | Starter feed |
| Wheat | 30.7 | 20.2 |
| Corn | 30.0 | 24.3 |
| Barley | — | 25.0 |
| Soybean extraction meal | 12.7 | 24.0 |
| Skim milk powder | 14.0 | — |
| Potato protein powder | 5.0 | — |
| Corn starch | 2.6375 | 2.6375 |
| Soybean oil | 1.752 | 0.45 |
| L-lysine-HCl | 0.097 | 0.253 |
| DL-methionine | 0.042 | 0.043 |
| L-threonine | — | 0.051 |
| Mineral feed, vit. | 3.1 | 3.1 |
| Nutrient analysis (g/kg) | | |
| Crude protein | 205 | 185 |
| Metabolizable energy, MJ/kg | 14.0 | 13.1 |
| Lysine | 12.5 | 11.0 |
| Methionine + cysteine | 7.5 | 6.6 |
| Threonine | 8.5 | 7.3 |
| Tryptophan | 2.5 | 2.2 |
| Calcium | 9.0 | 7.6 |
| Phosphorus | 7.0 | 6.6 |
| Sodium | 2.1 | 1.6 |

A preparation was produced from perlite as carrier, sorbic acid and citric acid as solid acids and lactic acid, propionic acid and formic acid as liquid acids. For this purpose, the procedure as described in examples 11, 12 and 13 was followed. The preparations were easy to handle and were readily added to the piglet prestarter and starter feeds.

Based on the sorbic acid content, concentrations of 0.875% and 0% (no addition) were added to the total animal feed. It was to be shown whether dosages which are still relatively low, but above the region of preservation, are already nutritionally active. Surprisingly, this addition to the feed, in all acid combinations, showed a marked dose-activity relationship in the piglet based on the growth. Additions increased the growth rates, starting from 547 g/day, by 11.9% more than the null experiment (with addition of preparation from example 11) or 7.4% (with addition of preparation from example 12) or 10.2% (with addition of preparation from example 13). The feed consumption/growth rate was significantly (p<0.05) positively influenced in each case. The results of this experiment are summarized in the table below.

Live weights, daily intakes, feed consumption and feed utilization of growing piglets with addition of sorbic-acid-containing preparation to the feed.

| Example No. | No addition | 11 | 12 | 13 |
|---|---|---|---|---|
| Addition, % | 0 | 2.5 | 2.5 | 2.6375 |
| Feeding period (0–42 days) | | | | |
| Growth rate, g/d | 489 ± 70 | 547 ± 95 | 525 ± 118 | 539 ± 82 |
| relative | 100 | 111.9 | 107.4 | 110.2 |
| Feed consumption, g/d | 781 ± 114 | 831 ± 149 | 787 ± 175 | 819 ± 113 |
| relative | 100 | 106.4 | 100.8 | 104.9 |
| Feed consumption per g of growth, g | $1.60^a$ ± 0.06 | $1.52^b$ ± 0.05 | $1.50^b$ ± 0.05 | $1.52^b$ ± 0.04 |
| relative | 100 | 95.0 | 93.8 | 95.0 |

$^{a,\,b}$Means significantly different ($p < 0.05$)

We claim:

1. A solid preparation which comprises sorbic acid, at least one acid which is liquid at room temperature of 23° C., and at least one other organic acid, different from sorbic acid, which is solid at room temperature of 23° C.

2. The preparation as claimed in claim 1, wherein it additionally comprises a carrier.

3. A preparation which comprises sorbic acid, at least one acid which is liquid at room temperature of 23° C., and at least one other organic acid, different from sorbic acid, which is solid at room termperature of 23° C., wherein the preparation comprises at least 80% by weight of acids.

4. The preparation as claimed in claim 1, wherein it comprises 10–60% by weight of sorbic acid, based on the preparation.

5. The preparation as claimed in claim 1, wherein it comprises >0–40% by weight, based on the preparation, of liquid acids.

6. The preparation as claimed in claim 5, wherein the liquid acid is selected from one or more of the following acids: propionic, acetic, lactic, valeric, formic, isobutyric, trimethylacetic, 2-methylbutyric, hexanoic, butyric, phosphoric, hydrochloric and sulfuric acids.

7. The preparation as claimed in claim 1, wherein it comprises >0 to 50% by weight, based on the preparation, of solid organic acids.

8. The preparation as claimed in claim 7, wherein the solid organic acid is selected from one or more of the following acids: fumaric, tartaric acid, malic, succinic, adipic, ascorbic, gluconic, citric and amino acids.

9. The preparation as claimed in claim 2, wherein it comprises a maximum of 20% of carrier.

10. The preparation as claimed in claim 2, wherein the carrier is perlite.

11. A feed which comprises a preparation as claimed in claim 1.

12. A feed additive which comprises a preparation as claimed in claim 1.

13. The feed as claimed in claim 11, wherein it comprises 0.125 to 7.5% by weight, based on the feed, of the preparation.

14. A method of using a preparation as claimed in claim 1 in pig husbandry, comprising feeding the preparation to a pig.

15. A method of using a preparation as claimed in claim 1 in calf husbandry, comprising feeding the preparation to a calf.

16. A method of using a preparation as claimed in claim 1 in lamb husbandry, comprising feeding the preparation to a lamb.

17. A method of using a preparation as claimed in claim 1 in poultry husbandry, comprising feeding the preparation to a poultry.

18. A preparation comprising sorbic acid, at least one acid which is liquid at 23° C., and at least one other organic acid, different from sorbic acid, which is solid at 23° C., said preparation further comprising a carrier having a porous structure.

19. A preparation comprising sorbic acid, at least one acid which is liquid at 23° C. and at least one other organic acid, different from sorbic acid, which is solid at 23° C., said sorbic acid present in said preparation in an amount ranging from 10 to 50% by weight;

said acid which is liquid at 23° C. present in said preparation in an amount ranging from 10 to 40% by weight; and said other organic acid which is solid at 23° C. present in said preparation in an amount ranging from 25 to 45% by weight.

* * * * *